US007644272B2

United States Patent
Frank et al.

(10) Patent No.: US 7,644,272 B2
(45) Date of Patent: Jan. 5, 2010

(54) SYSTEMS AND METHODS FOR PROVIDING SECURITY TO DIFFERENT FUNCTIONS

(75) Inventors: Edward H. Frank, Atherton, CA (US); Mark Buer, Gilbert, AZ (US); Jeyhan Karoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 816 days.

(21) Appl. No.: 11/216,271

(22) Filed: Aug. 30, 2005

(65) Prior Publication Data

US 2006/0089124 A1   Apr. 27, 2006

Related U.S. Application Data

(60) Provisional application No. 60/621,288, filed on Oct. 22, 2004.

(51) Int. Cl.
G06F 21/00 (2006.01)
(52) U.S. Cl. .......................................... 713/167; 380/247
(58) Field of Classification Search ..................... 726/9, 726/2–4; 380/247, 264, 278, 283; 713/158, 713/166, 170, 185, 167
See application file for complete search history.

(56) References Cited

U.S. PATENT DOCUMENTS 7,073,073 B1 *   7/2006   Nonaka et al. .............. 713/193

2002/0072395 A1 *   6/2002   Miramontes ................. 455/566
2004/0181303 A1 *   9/2004   Walmsley .................... 700/115
2005/0278787 A1 *   12/2005   Naslund et al. ............... 726/26
2007/0054655 A1 *   3/2007   Fantini et al. ................ 455/411

* cited by examiner

*Primary Examiner*—Gilberto Barron, Jr.
*Assistant Examiner*—Virginia Ho
(74) *Attorney, Agent, or Firm*—McAndrews, Held & Malloy, Ltd (57) ABSTRACT

Methods and systems are provided that use smartcards, such as subscriber identity module (SIM) cards to provide secure functions for a mobile client. One embodiment of the invention provides a mobile communication network system that includes a mobile network, a mobile terminal, a server coupled to the mobile terminal via the mobile network, and a subscriber identity module (SIM) card coupled to the mobile terminal. The SIM card includes a first key and a second key. The first key is used to authenticate an intended user of the mobile terminal to the mobile network. Upon successful authentication of the intended user to the mobile network, the mobile terminal downloads a function offered from the server through the mobile network. The second key is then used by the mobile terminal to authenticate the intended user to the downloaded function so that the intended user can utilize the function.

29 Claims, 13 Drawing Sheets

SYSTEMS AND METHODS FOR PROVIDING SECURITY TO DIFFERENT FUNCTIONS

CROSS-REFERENCE TO RELATED APPLICATION(S)

This application claims priority to and the benefit of U.S. Provisional Application No. 60/621,288, filed Oct. 22, 2004, the entire content of which is incorporated herein by reference.

FIELD OF THE INVENTION

The invention relates generally to the field of data communications and, more particularly, to systems and methods for providing secure functions on mobile terminals using smartcards, such as subscriber identity module (SIM) cards.

BACKGROUND OF THE INVENTION

Currently, cables and wires are predominately used in communication networks for transferring information such as voice, video, data, etc. from one device to another. Devices on a communication network can generally be categorized as two types: servers and clients. Those devices that provide services/functions to other devices are servers; the devices that connect to and utilize the provided services/functions are clients. Generally in a wired network, authentication of a user for accessing a wired network, such as a local area network (LAN), can require the user to sign-on by providing information such as a login identification and a password on a client. And because each client within the wired network is physically connected to the network and can have a unique address, a communication session between a server on the wired network and the client is generally secure.

However, there is a growing desire to have network clients be portable or to have a mobile client that can operate beyond a defined environment. In contrast to wired clients, wireless or mobile clients can establish a communication session with a server without being physically connected to cables or wires. Accordingly, information such as voice, video, and data are transmitted and received wirelessly from one device to another and the information can be intercepted or tampered with by an impersonator posing as an intended user. Therefore, one way to ensure security within a mobile communication network would be to provide a system and method that can authenticate and identify the intended user to the mobile communication network supplying the services/functions.

In addition, as the development of mobile communication network technology continues to advance, various functions that can be downloaded through the mobile communication network to a mobile client have also advanced. These advanced functions (e.g., a call waiting function, a caller identification function, a music playing function, etc.) may require a higher level of security. Thus, there is also a need to provide additional security or securities for these advance functions to an intended user that goes beyond authenticating the intended user to the mobile communication network that is supplying the functions.

SUMMARY OF THE INVENTION

The invention relates to systems and associated methods for providing secured functions to mobile clients using smartcards, such as subscriber identity module (SIM) cards (but not exclusively). For example, a mobile network architecture constructed according to the invention provides secure provision and storage of keys and provides decryption and encryption of functions that are downloaded to a mobile client over a mobile network with additional security or securities.

One embodiment of the invention provides a communication system for providing secure mobile terminal functions. The mobile system includes a mobile network, a mobile terminal coupled to the mobile network, a function capsule including a function of the mobile terminal, and a smartcard. The smartcard is coupled to the mobile terminal and includes a first key and a second key. The first key is used to authenticate an intended user of the mobile terminal to the mobile network and to download the function capsule from the mobile network to the mobile terminal. The second key is used to authenticate the intended user to the function capsule on the mobile terminal.

In addition, the smartcard may include one or more encryption keys for encrypting and decrypting the data transmitted between the mobile terminal and the mobile network.

The keys on a smartcard of the invention may be provided through a key writing or burning site (e.g., a music retailer, a mobile phone retailer, etc). The key writing or burning site may be connected to an authentication server (and/or another server) via a network (e.g., the Internet) so that a new authentication key or keys can be written and/or burned into the smartcard. In one embodiment, the key writing or burning site allows an intended user to purchase a desired function and burns and/or writes a key into the smartcard to authenticate the user to the desired function.

One embodiment of the invention provides a method for providing secure functions to a mobile client. The method includes transmitting a first random number from within a mobile network to a mobile client. The mobile client computes a first response based on the transmitted first random number using a first key in the mobile client. The mobile client then transmits the first response to the mobile network. The mobile network then calculates a first value based on the first random number using a copy of the first key. If the first response does not agree with the first value, access of the mobile client to the mobile network is terminated. If the first response agrees with the first value, a function capsule is downloaded from the mobile network to the mobile client. A second random number is then provided from the downloaded function capsule to the mobile client. The mobile client then computes a second response based on the second random number using a second key. The downloaded function capsule then calculates a second value based on the second random number using a copy of the second key. If the second response does not agree with the second value, access of the mobile client to the downloaded function capsule is denied. If the second response agrees with the second value, the mobile client is allowed access to the downloaded function capsule (and/or is able to utilize a function of the mobile client downloaded with the function capsule).

A more complete understanding of the systems and methods for providing security to different functions will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
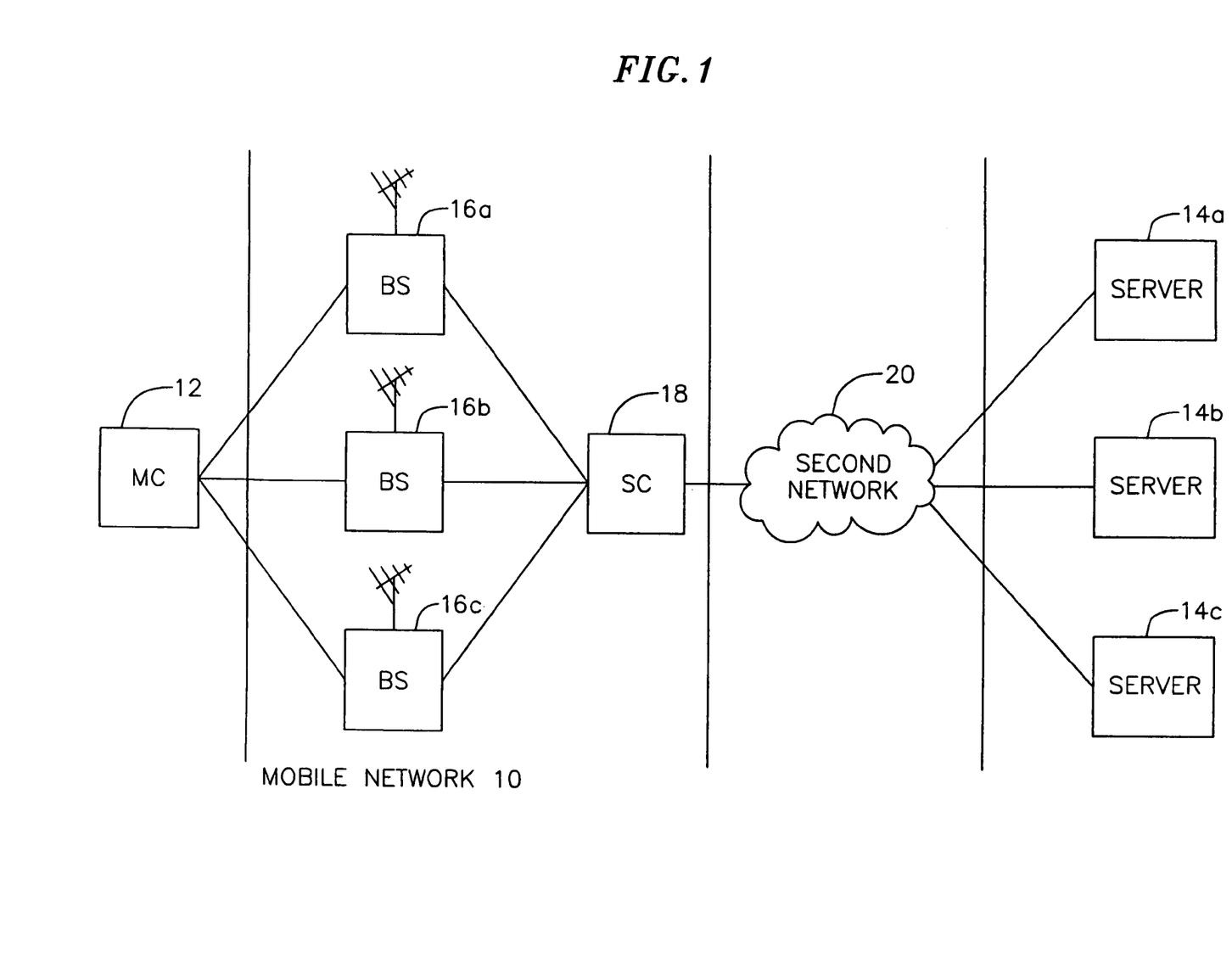
FIG. 1 is a schematic diagram of a mobile communication network architecture pursuant to aspects of the invention.

FIG. 1 is a block diagram of a mobile communication network architecture that uses a smartcard for authentication and/or encryption. Exemplary embodiments of the present invention can be applied to the network architecture of FIG. 1, as well as other suitable architectures.

The network architecture of FIG. 1 includes mobile network 10 that facilitates communications between one or more mobile clients, such as mobile client 12, and one or -more servers 14 (e.g., 14a, 14b, and/or 14c). Mobile network 10 may be a wireless communications system that supports the Global System for Mobile Communications (GSM) protocol. However, other multi-access wireless communications protocol, such as General Packet Radio Services (GPRS), High Data Rate (HDR), Wideband Code Division Multiple Access (WCDMA) and/or Enhanced Data Rates for GSM Evolution (EDGE), may also be supported. Mobile client 12 may be any device that is adapted for wireless communications with mobile network 10, such as a cellular telephone, pager, personal digital assistant (PDA), vehicle navigation system, and/or portable computer.

Mobile network 10 includes one or more base stations 16 (e.g., 16a, 16b, and/or 16c) and switching center 18. Mobile network 10 connects mobile client 12 to servers 14a, 14b, and/or 14c either directly (not shown) and/or through second network 20, such as a Public Switched Telephone Network (PSTN), an Integrated Services Digital Network (ISDN), a Packet Switched Public Data Network (PSPDN), a Circuit Switched Public Data Network (CSPDN), a local area network (LAN), the Internet, etc. Mobile network 10 is operated by a carrier that has an established relationship with an intended user (or subscriber) of mobile client 12 to use the wireless services provided through mobile network 10.

Figure 2:
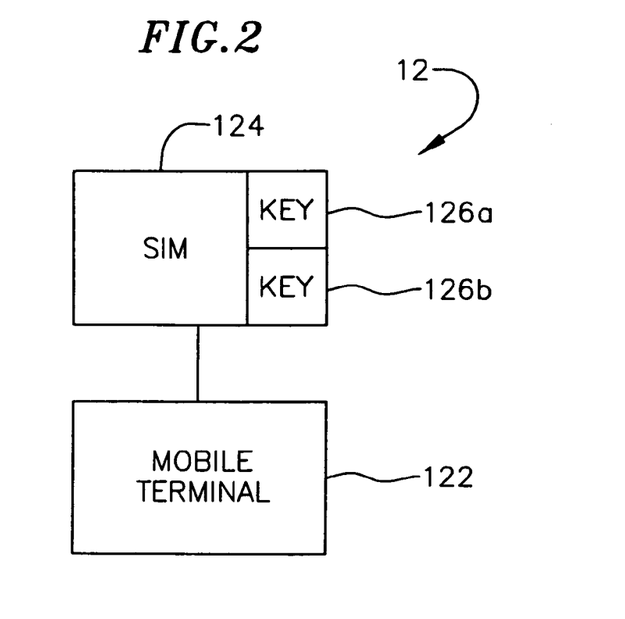
FIG. 2 is a more detailed schematic diagram of a mobile client of FIG. 1.

Referring now to FIG. 2, mobile client 12 includes mobile terminal 122 (e.g., a mobile equipment or a phone) and smartcard 124. More specifically, smartcard 124 of FIG. 2 is a Subscriber Identity Module (SIM). SIM (or SIM card) 124 contains encryption key 126a that encrypts voice and data transmissions to and from mobile network 10 and authentication key 126b that specifies an intended user so that the intended user can be identified and authenticated to mobile network 10 supplying the mobile services. SIM 124 can be moved from one mobile terminal 122 to another terminal (not shown) and/or different SIMs can be inserted into any terminal, such as a GSM compliant terminal (e.g., a GSM phone).

To provide additional security, mobile terminal 122 may include an International Mobile Equipment Identity (IMEI) that uniquely identifies mobile terminal 122 to network 10. SIM card 124 may be further protected against unauthorized use by a password or personal identity number.

Referring now back to FIG. 1, each base station 16a, 16b, 16c includes a radio transceiver that defines a cell and handles the radio-link protocols with mobile client 12. A base station controller (not shown) may also be coupled between one or more base stations 16a, 16b, 16c and switching center 18 to manage the radio resources for one or more base stations 16a, 16b, 16c. The base station controller may handle radio-channel setup, frequency hopping, and handovers (e.g., as the mobile client moves from one base station coverage are or cell to another).

The central component of mobile network 10 is switching center 18. Switching center 18 acts like a normal switching node, such as a switching node in a PSTN or ISDN, and additionally provides all the functionality needed to handle an intended mobile user (subscriber), such as registration, authentication, location updating, handovers, and call routing to a roaming subscriber. In FIG. 1, it is switching center 18 that provides the connection of mobile client 12 to second network 20 (such as the LAN, the PSTN, the ISDN etc).

Figure 3:
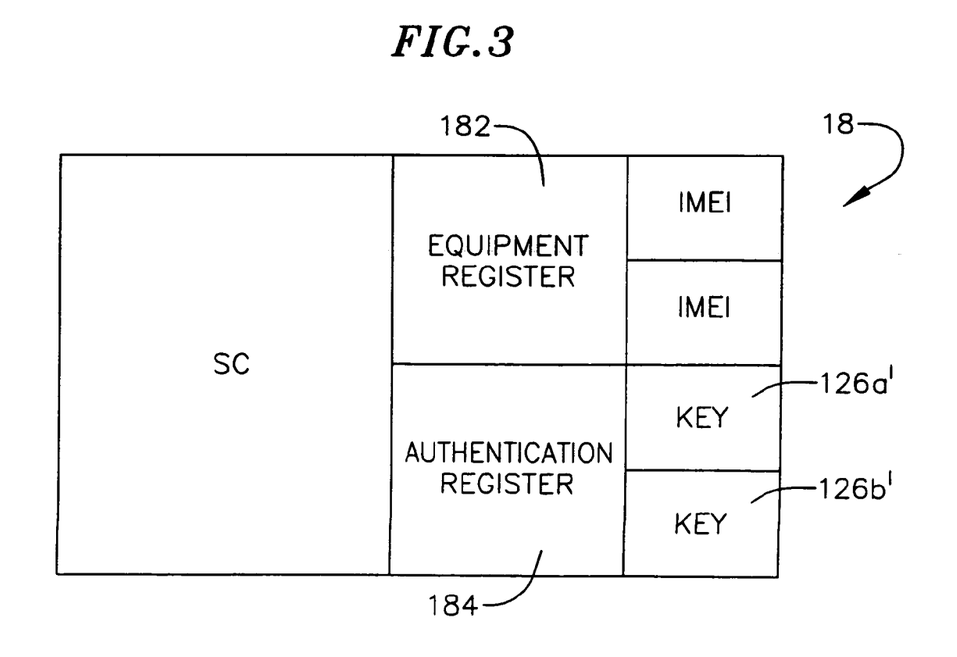
FIG. 3 is a more detailed schematic diagram of a switching center of FIG. 1.

Referring now to FIG. 3, switching center 18 includes equipment identity register 182 and authentication register 184. Identity register 182 includes a database that contains a list of all valid mobile terminals (e.g. 122 of FIG. 2) on network 10, where each mobile client (e.g., 12) is identified by its International Mobile Equipment Identity (IMEI). An IMEI is marked a invalid if it has been reported stolen or is not type approved. Authentication register 184 is a protected database that stores copies 126a', 126b' of the secret keys (e.g., 126a, 126b) stored in each intended user's (or subscriber's) SIM card (e.g., 124), which are used for authentication of an intended user and encryption/decryption of data transmitted over a radio channel of mobile network 10.

Specifically, referring now also to FIGS. 1 and 2, mobile network 10 can be a GSM compliant network that authenticates the identity of an intended user through the use of a challenge-response mechanism. A 128-bit random number is sent to mobile client 12 from mobile network 10. Mobile client 12 computes a 32-bit signed response based on the random number sent to mobile client 12 with an authentication algorithm using individual subscriber authentication key 126b. Upon receiving the signed response from mobile client 12, mobile network 10 repeats the calculation to verify the identity of the user. Note that individual subscriber authentication key 126b is not transmitted over the radio channel. It should only be present in SIM card 124, as well as authentication register 184. If the signed response received by network 10 agrees with the calculated value, mobile client 12 has been successfully authenticated and may continue. If the values do not match, the connection to network 10 is terminated.

In addition, SIM card 124 of FIGS. 1, 2, and 3 contains encryption key 126a. Encryption key 126a is used to encrypt and decrypt the data transmitted between mobile client 12 and mobile network 10. The encryption of the voice and data communications between mobile client 12 and network 10 is accomplished through use of an encryption algorithm. An encrypted communication is initiated by an encryption request command from mobile network 10. Upon receipt of this command, mobile client 12 begins encryption and decryption of data using the encryption algorithm and encryption key 126a.

As envisioned, an embodiment of the present invention provides additional security and/or securities to functions downloaded from a mobile communication network to a mobile client using a SIM card that goes beyond authenticating an intended user to the mobile communication network and encrypting/decrypting data to and from the network.

Figure 4:
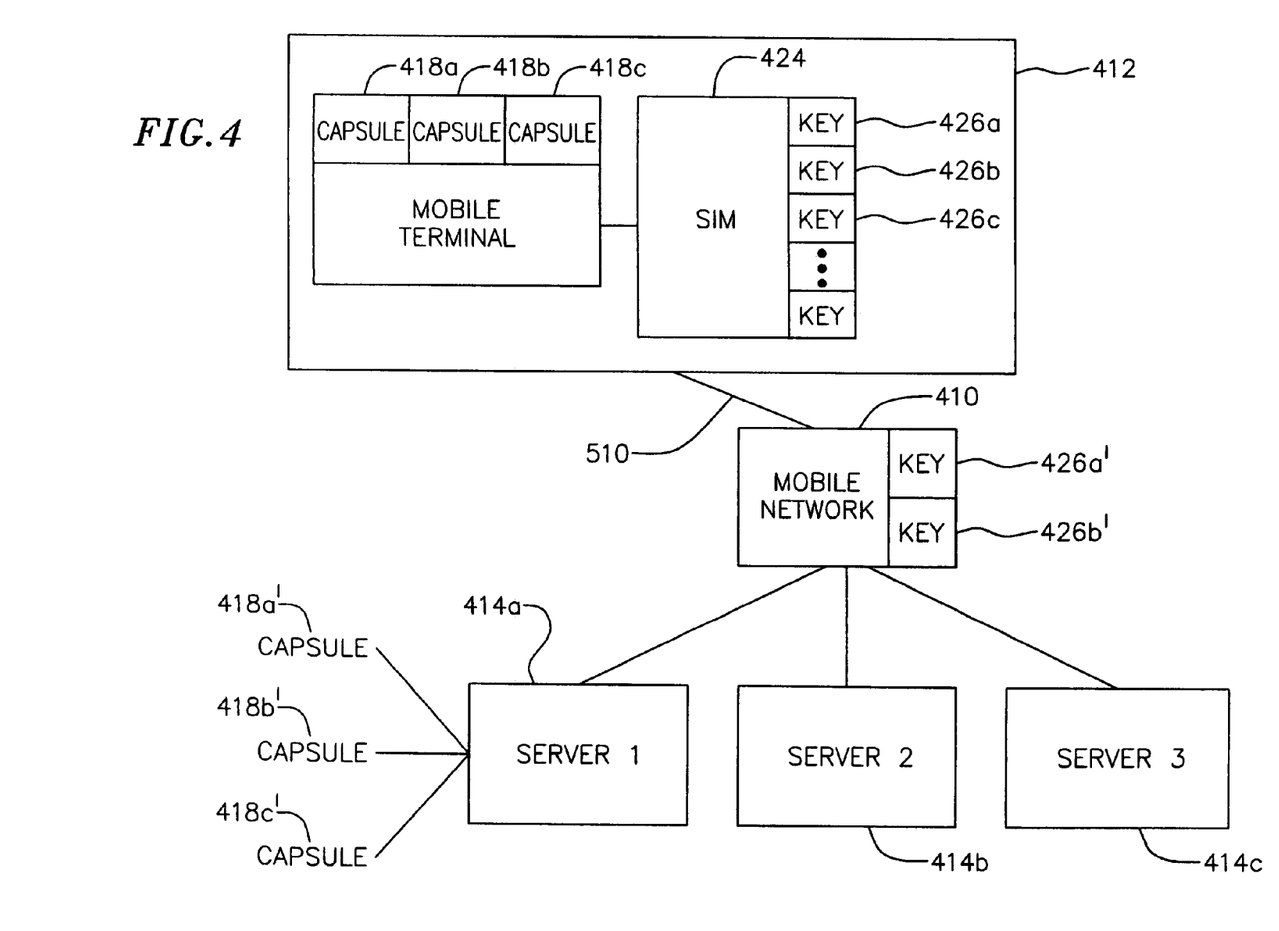
FIG. 4 is a schematic diagram of another mobile communication network architecture pursuant to aspects of the invention.

Referring to FIG. 4, a mobile communication network architecture pursuant to the present invention includes mobile network 410 that facilitates communications between one or more mobile clients, such as mobile client 412, and one or more servers 414a, 414b, 414c. Mobile network 410 may be a wireless communications network similar to the mobile network of FIG. 1, as well as other suitable networks.

In particular, mobile network 410 of FIG. 4 includes copies 426a', 426b' of secret keys 426a, 426b stored in SIM card 424. Keys 426a, 426b, 426a', 426b' are used for authenticating the intended user of SIM card 424 to mobile network 410 and encryption/decryption of data transmitted between mobile network 410 and mobile client 412 via communication link 510. Copies 426a', 426b' of the secret keys may be stored in an authentication register (e.g., register 184 of FIG. 3) and be managed by a switching center (e.g., switching center 18). In addition, to provide an additional security, SIM (or SIM card) 424 contains second authentication key 426c for authenticating the intended user to one or more function capsules 418a, 418b, 418c on mobile client 412.

In one embodiment, a function capsule on mobile client 412, such as function capsule 418a, includes a call waiting function of mobile client 412. Function capsule 418a and/or another capsule 418b, 418c may also include a caller identification (ID) function of mobile client 412, an e-mailing function of mobile client 412, a function for providing a highly sensitive financial service to mobile client 412, a payment function of mobile client 412, a product/service ordering function of mobile client 412, a music function of mobile client 412 (e.g., compressing, depressing, and/or playing functions), etc.

Also, as is shown in FIG. 4, server 414a includes (or is coupled to) copies 418a', 418b', 418c' of function capsules 418a, 418b, 418c. These copies 418a', 418b', 418c' may be downloaded to mobile client 412 as capsules 418a, 418b, 418c on mobile client 412. In one embodiment, capsules 418a, 418b, 418c of mobile client 412 are downloaded from server 414a via mobile network 410 after the intended user has been authenticated to mobile network 410 using secret keys 426a, 426b on SIM card 424.

Figure 5:
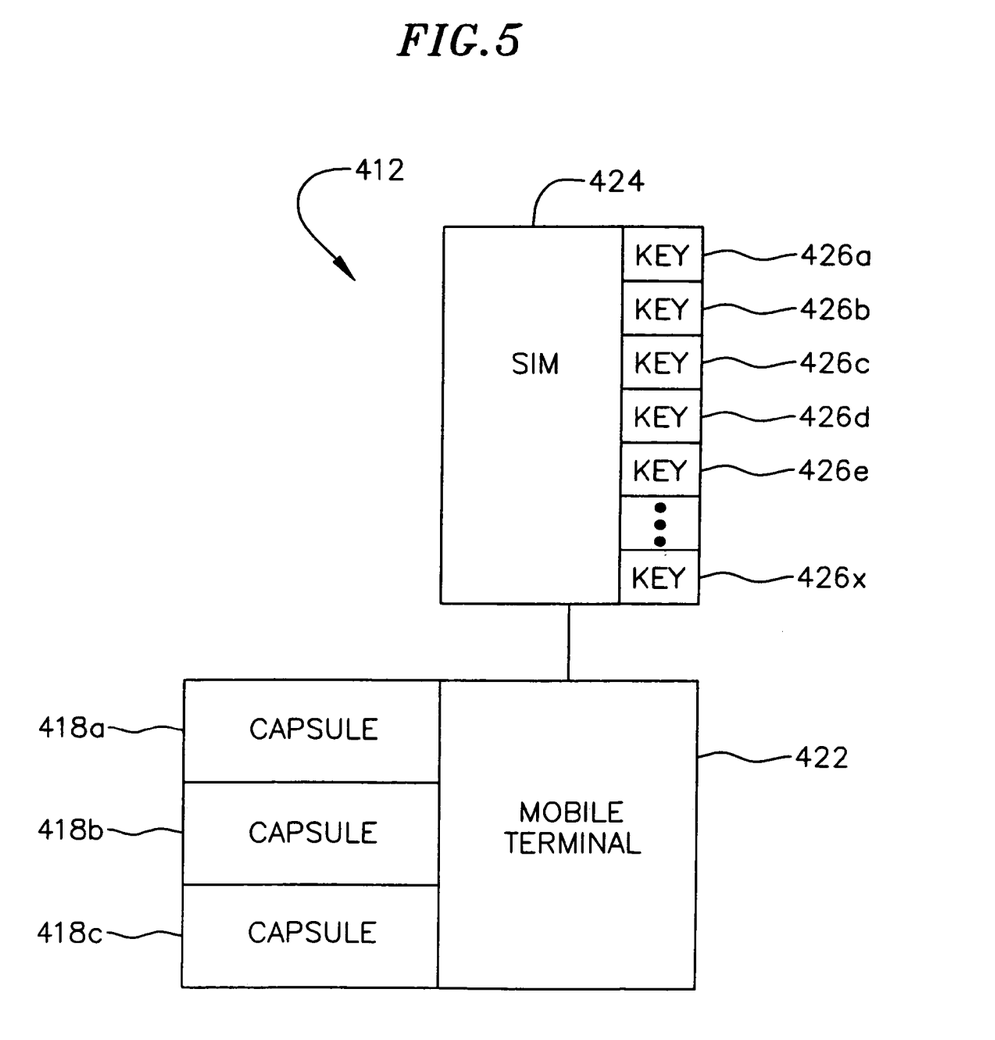
FIG. 5 is a more detailed schematic diagram of a mobile client of FIG. 4.

Referring now to FIGS. 4 and 5, mobile client 412 includes mobile terminal 422 (e.g., a phone, a PDA, etc.) and Subscriber Identity Module (SIM) 424. SIM (or SIM card) 424 contains encryption key 426a that encrypts voice and data transmissions to and from mobile network 410 and authentication key 426b that specifies an intended user so that the intended user can be identified and authenticated to mobile network 410. In addition, SIM 424 includes one or more additional keys (e.g., 426c, 426d, etc.) to authenticate the intended user to one or more function capsules 418a, 418b, 418c stored in mobile terminal 422.

Figure 6:
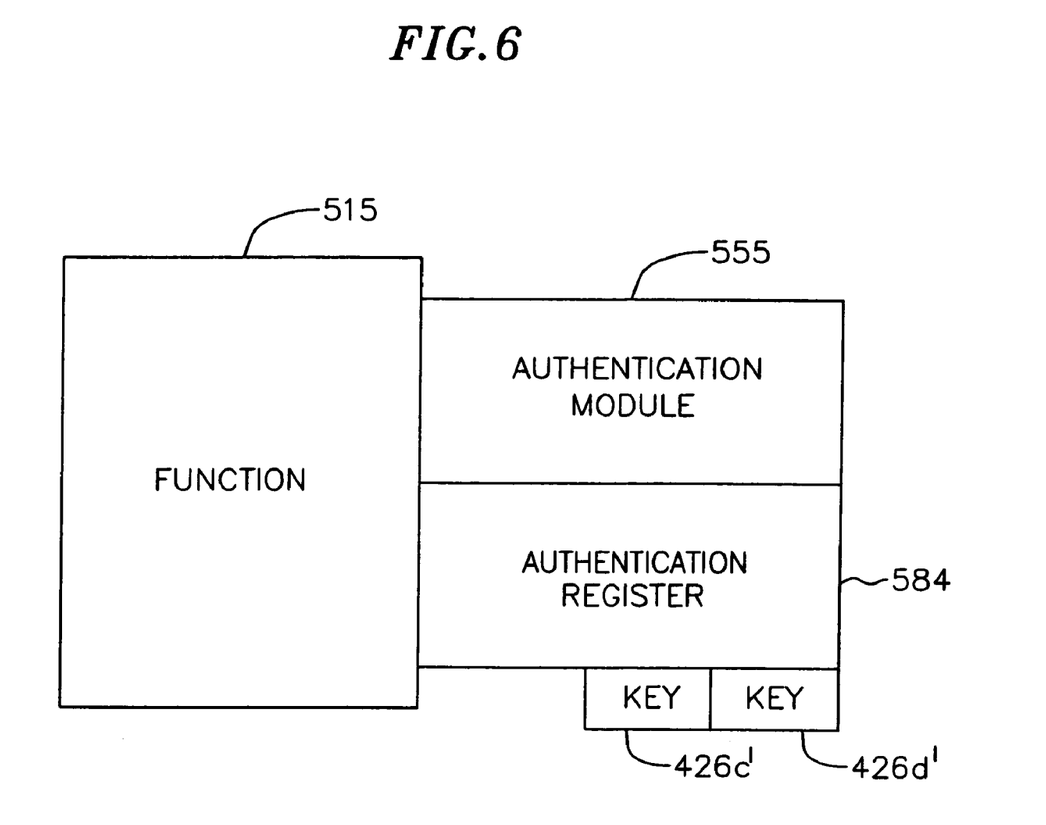
FIG. 6 is a detailed schematic diagram of a first embodiment of a function capsule of FIG. 5.

Specifically and referring now to FIGS. 5 and 6, a function capsule on mobile terminal 422, such as function capsule 418a, includes an authentication module 555. Authentication module 555 is a capsule facility that can be downloaded to mobile client 412 and be used for ensuring legitimacy of a user and/or for associating the legitimate (or intended) user to its desired function 515 on the function capsule.

In particular, authentication module 555 includes (or is coupled to) function authentication register 584. Function authentication register 584 is a storage facility of authentication module 555 that stores copies 426c', 426d' of secret keys 426c, 426d of SIM card 424. Using copies 426c, 426d of the secret keys, authentication module 555 can authenticate the intended user to function 515 stored in the function capsule. In one embodiment, key 426c' is used for accessing (and/or decrypting) the function capsule and key 426d' is used for authenticating the intended user to function 515 of the function capsule so that the user can utilize function 515.

Figure 7:
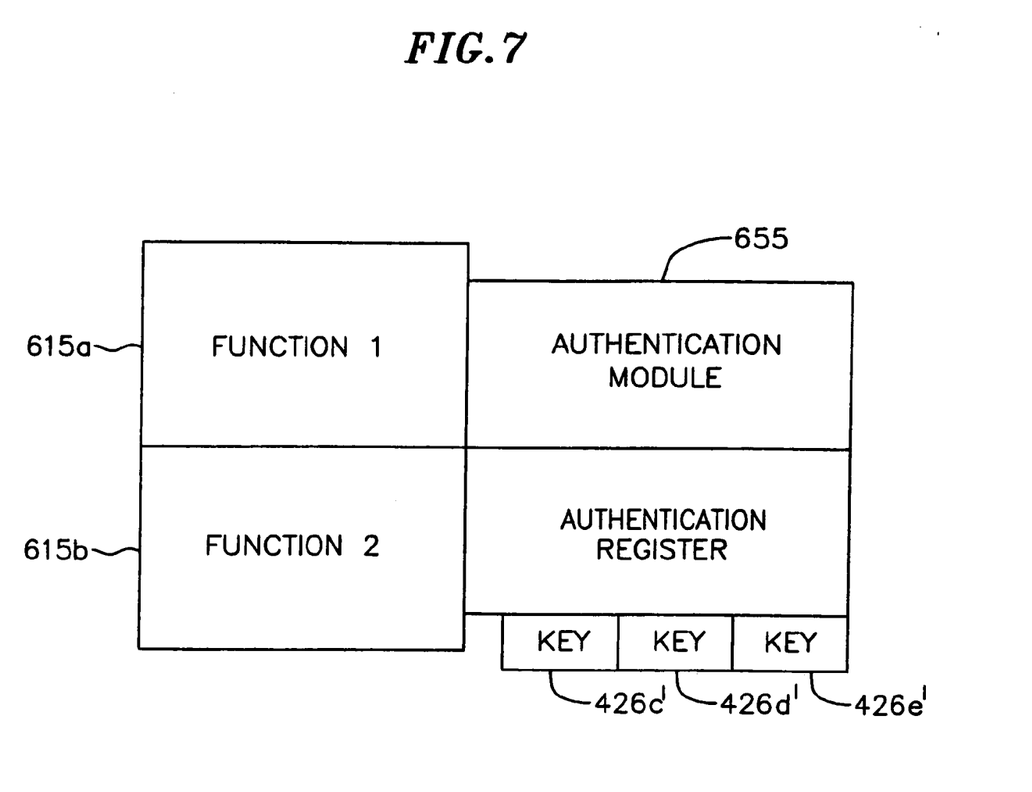
FIG. 7 is a detailed schematic diagram of a second embodiment of a function capsule of FIG. 5.

Referring now to FIGS. 5 and 7, a function capsule in another embodiment of the present invention includes first function 615a, second function 615b, and authentication module 655. In this embodiment, authentication module 655 includes copies 426c', 426d' of secret keys 426c, 426d stored in SIM card 424. In addition, authentication module 655 includes copy 426e' of secret key 426e of SIM card 424. Using these three secret keys 426c', 426d', 426e', authentication module 655 can authenticate the intended user to a particular function from the plurality of functions 615a, 615b stored in the function capsule. In particular, key 426c' may be used for authenticating the intended user to the function capsule, key 426d' may be used for authenticating the intended user to utilize function 615a, and key 426e' may be used for authenticating the intended user to utilize function 615b.

Figure 8:
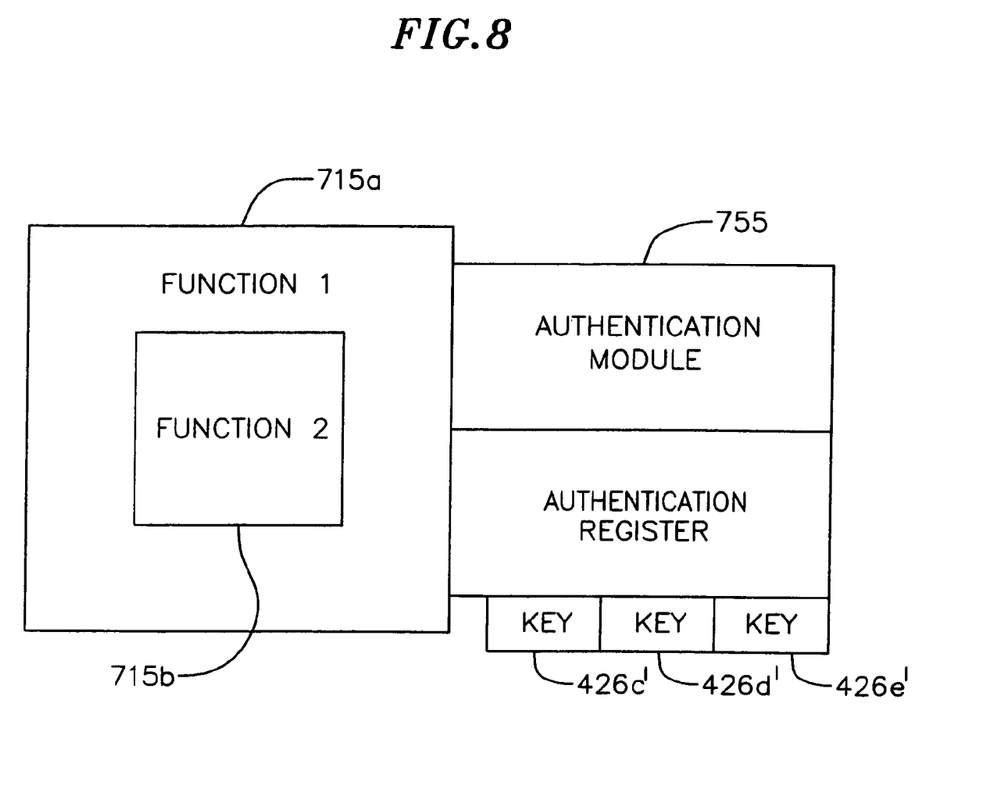
FIG. 8 is a detailed schematic diagram of a third embodiment of a function capsule of FIG. 5.

Referring now to FIGS. 5 and 8, a function capsule in yet another embodiment of the present invention includes first function 715a, second function 715b, and authentication module 755. Like authentication module 655 of FIG. 7, authentication module 755 also includes copies 426c', 426d', 426e' of secret keys 426c, 426d, 426e stored in SIM card 424. However, unlike the embodiment of FIG. 7, here a first key (e.g., key 426d') must first be used for authenticating the intended user to utilize first function 715a before a second key (e.g., key 426e') can be used for authenticating the intended user to utilize second function 715b.

Figure 9:
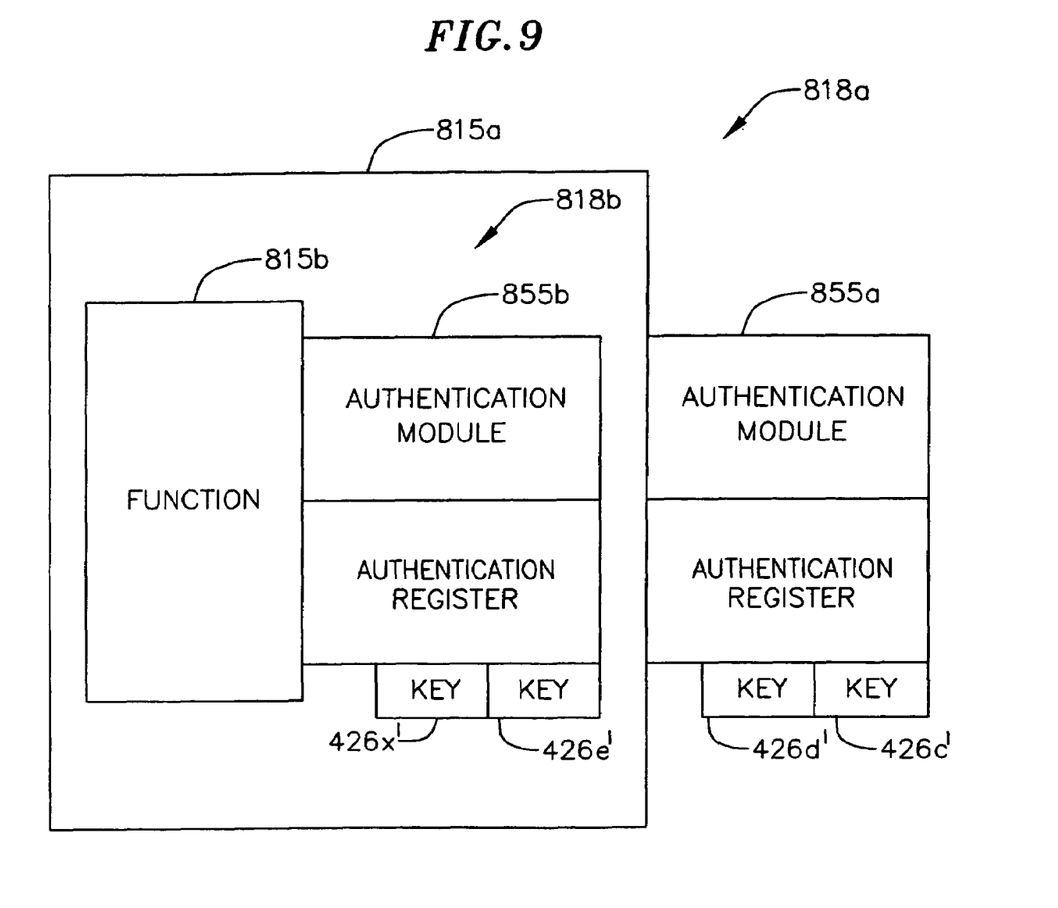
FIG. 9 is a detailed schematic diagram of an embodiment of a plurality of function capsules of FIG. 5.

Referring now to FIGS. 5 and 9, a further embodiment of the present invention includes function capsule 818b within function capsule 818a. Specifically, function capsule 818a includes first function 815a and first authentication module 855a. First function 815a includes second function 815b and second authentication module 855b. In this embodiment, first authentication module 855a includes copies 426c', 426d' of secret keys 426c, 426d stored in SIM card 424 and second authentication module 855b includes copies 426e', 426x' of secret keys 426e, 426x' stored in SIM card 424. Here, key 426c' may be used for accessing first function 815a, key 426d' may used for authenticating the user to utilize first function

815*a*, key 426*e*' may be used for accessing second function 815*b*, and key 426*x*' may be used for authenticating the user to utilize second function 815*b*.

Figure 10:
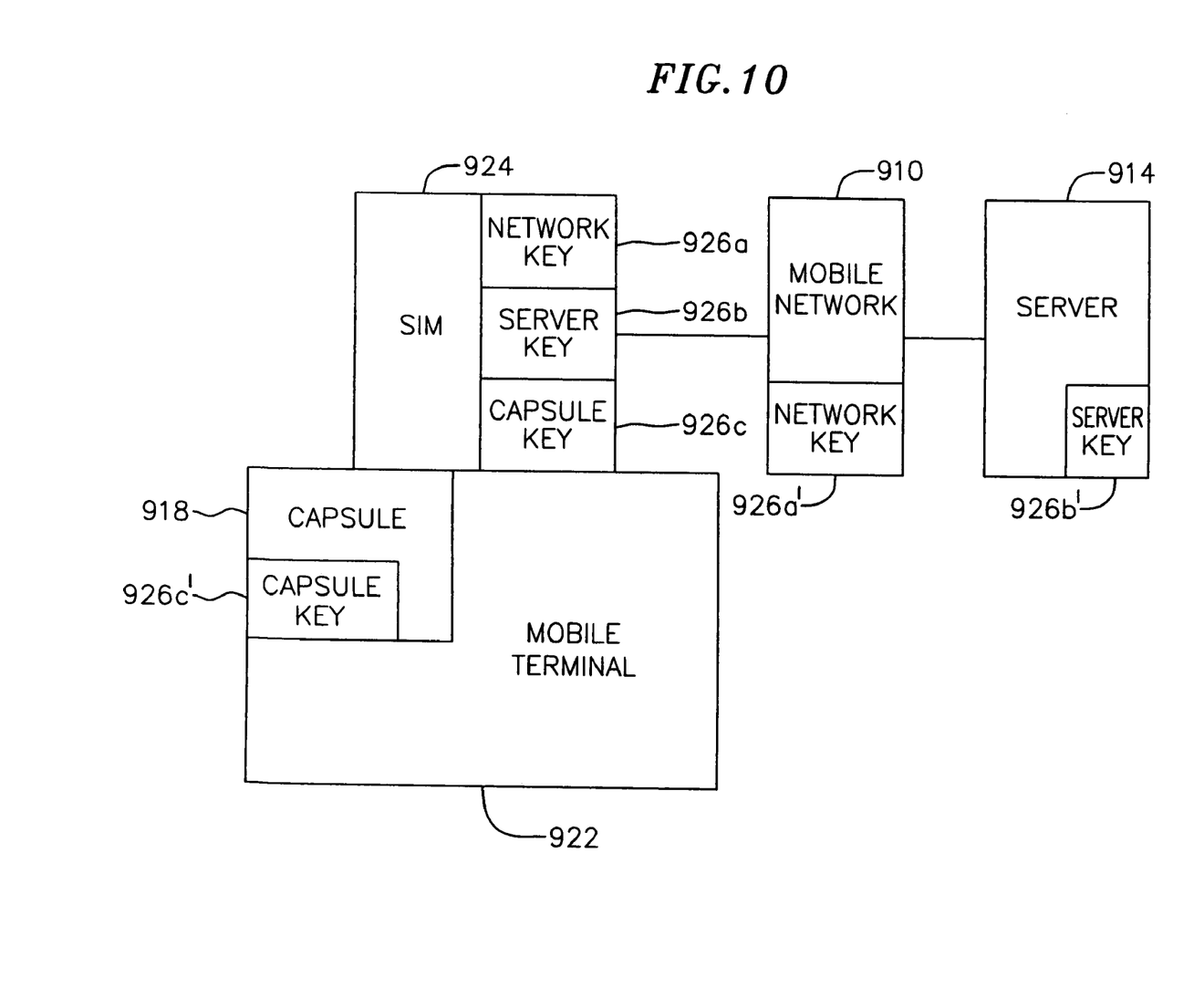
FIG. 10 is a schematic diagram of yet another mobile communication network architecture pursuant to aspects of the invention.

Moreover, to provide additional protection, FIG. 10 shows that SIM card 924 coupled to mobile terminal 922 includes network key 926*a*, server key 926*b*, and capsule key 926*c*. Mobile network 910 includes copy 926*a*' of network key 926*a* to authenticate an intended user to mobile network 910. Server 914 includes copy 926*b*' of server key 926*b* to authenticate the intended user to server 914 (e.g., a data server). Function capsule 918 downloaded to mobile terminal 922 (e.g., from server 914 via mobile network 910) includes copy 926*c*' of capsule key 926*c* to authenticate the intended user so that the intended user can utilize a function of function capsule 918 on mobile terminal 922.

In addition, and/or in an alternative to the above described embodiment, server 914 of FIG. 10 (and/or another server) may be used to revoke (or erase) key 926*a*, key 926*b*, and/or key 926*c* in SIM card 924 using key 926*b*' (and/or another key). In one embodiment, keys 926*a*, 926*b*, 926*c* (or another key) in SIM card 924 may be revoked wirelessly via mobile network 910.

Figure 11:
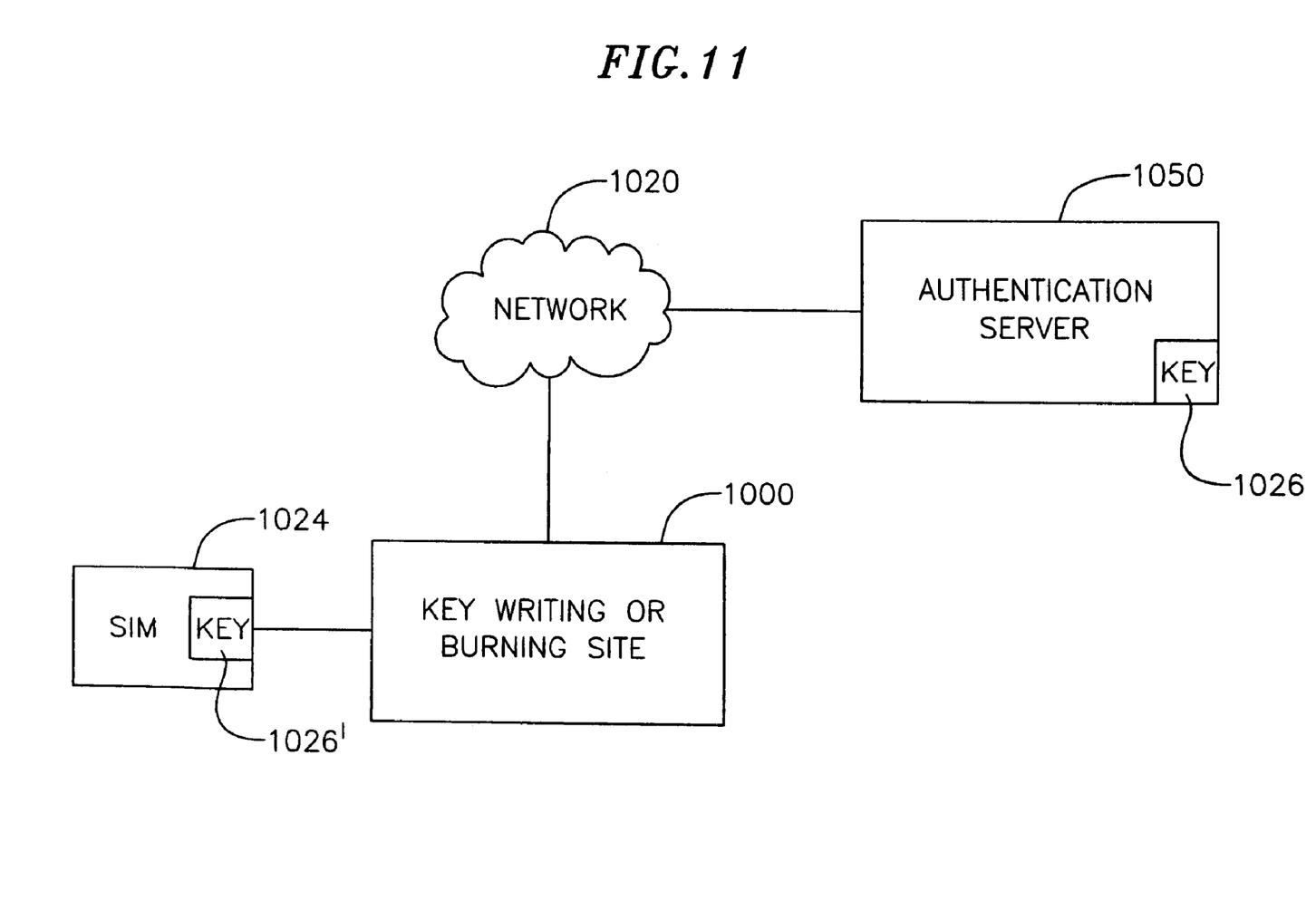
FIG. 11 is a schematic diagram of a system and method for providing keys to a subscriber identity module (SIM) card pursuant to aspects of the invention.

Referring now to FIG. 11, an embodiment for providing keys to SIM card 1024 of an intended user pursuant to the present invention is shown. The embodiment includes key writing or burning site 1000 (e.g., a music retailer, a mobile phone retailer, etc.). Key writing or burning site 1000 may be connected to authentication server 1050 (and/or another server) via network 1020 (e.g., the Internet) so that copy 1026' of new authentication key (or keys) 1026 can be written and/or burned into SIM card 1024. Key writing or burning site 1000 can be made accessible to the intended user at a time when SIM card 1024 is purchased, at a time when the intended user desires to receive a function (e.g., a music playing function, a call waiting function, a caller identification function, etc.), and/or any other time. Specifically, in one embodiment, key writing or burning site 1000 allows the intended user to purchase a desired function for a mobile client and burns and/or writes authentication key 1026' into SIM card 1024 to authenticate the user to the desired function upon the purchase of the function.

In addition, key writing or burning site 1000 may be connected to SIM card 1024 via a mobile network (e.g., network 10, 410, and/or 910) and then wirelessly burns and/or writes copy 1026' of new authentication key 1026 into SIM card 1024. Further, authentication key 1026 (and/or another key) in server 1050 may be used to later revoke (or erase) copy 1026' of key 1026 written into SIM card 1024. In one embodiment, copy 1026' of key 1026 may be revoked wirelessly (e.g., via the mobile network that was used to write copy 1026' of key 1026 into SIM card 1024).

Figure 12:
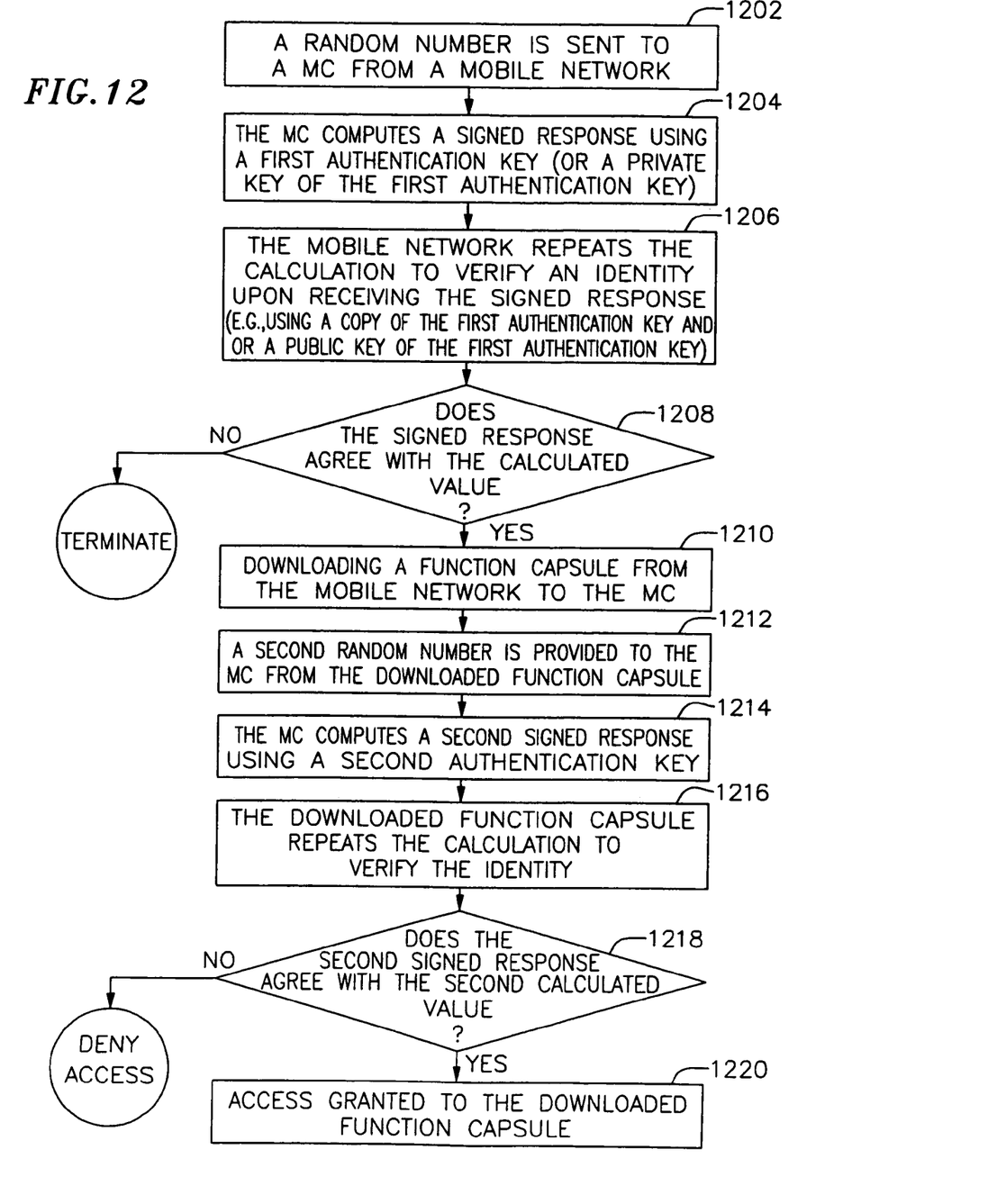
FIG. 12 is a flowchart representative of one embodiment of operations pursuant to aspects of the invention.

In general, according to the foregoing, the invention provides a method for providing secure functions to a mobile client using a SIM card, as diagramed in FIG. 12. At block 1202, a random number (e.g., a 128-bit number) is sent to a mobile client (MC) from within a mobile network. At block 1204, the mobile client computes a signed response (e.g., a 32-bit response) based on the random number sent to the mobile client with an authentication algorithm using a first authentication key. At block 1206, upon receiving the signed response from the mobile client, the mobile network repeats the calculation to verify the identity of an intended user. At block 1208, if the signed response received by the network agrees with the calculated value, the mobile client has been successfully authenticated and moves to block 1210. If the values do not match, the connection to the network is terminated.

At block 1210, a function capsule is downloaded from the mobile network to the mobile client. At step 1212, a second random number (e.g., a second 128-bit number) is provided to the mobile client from the downloaded function capsule. At block 1214, the mobile client computes a second signed response (e.g., a second 32-bit response) based on the random number provided to the mobile client with a second authentication algorithm using a second authentication key. At block 1216, using a copy of the second authentication key, the downloaded function capsule repeats the calculation to verify the identity of the intended user. At block 1218, if the signed response agrees with the calculated value, the mobile client has been successfully authenticated and moves to block 1220 to access the downloaded function capsule (and/or to utilize a function of the downloaded function capsule). If the values do not match, the access to the downloaded function capsule is denied.

In addition, one or more encryption keys may be used to encrypt and decrypt the data communicated between the mobile client and the mobile network and/or between the mobile client and the function capsule. As an example, encryption of the voice and data communications can be accomplished through use of an encryption algorithm. The mobile client begins encryption and decryption of data using the encryption algorithm and one or more of the encryption keys.

Moreover, an authentication server and/or another server may be used to remotely revoke the second authentication key and/or another key (e.g., the first authentication key) via the mobile network.

Lastly, an authentication and/or encryption key may have a private key and a related but different public key, a copy of which is made available outside the SIM card. A challenge may then be supplied to the SIM card and a response is generated using the private key. The response may be checked by the use of the related public key. Thus, if the private key is held only within the SIM card then only the SIM card can generate an authentication response that would work with the public key value.

Figure 13:
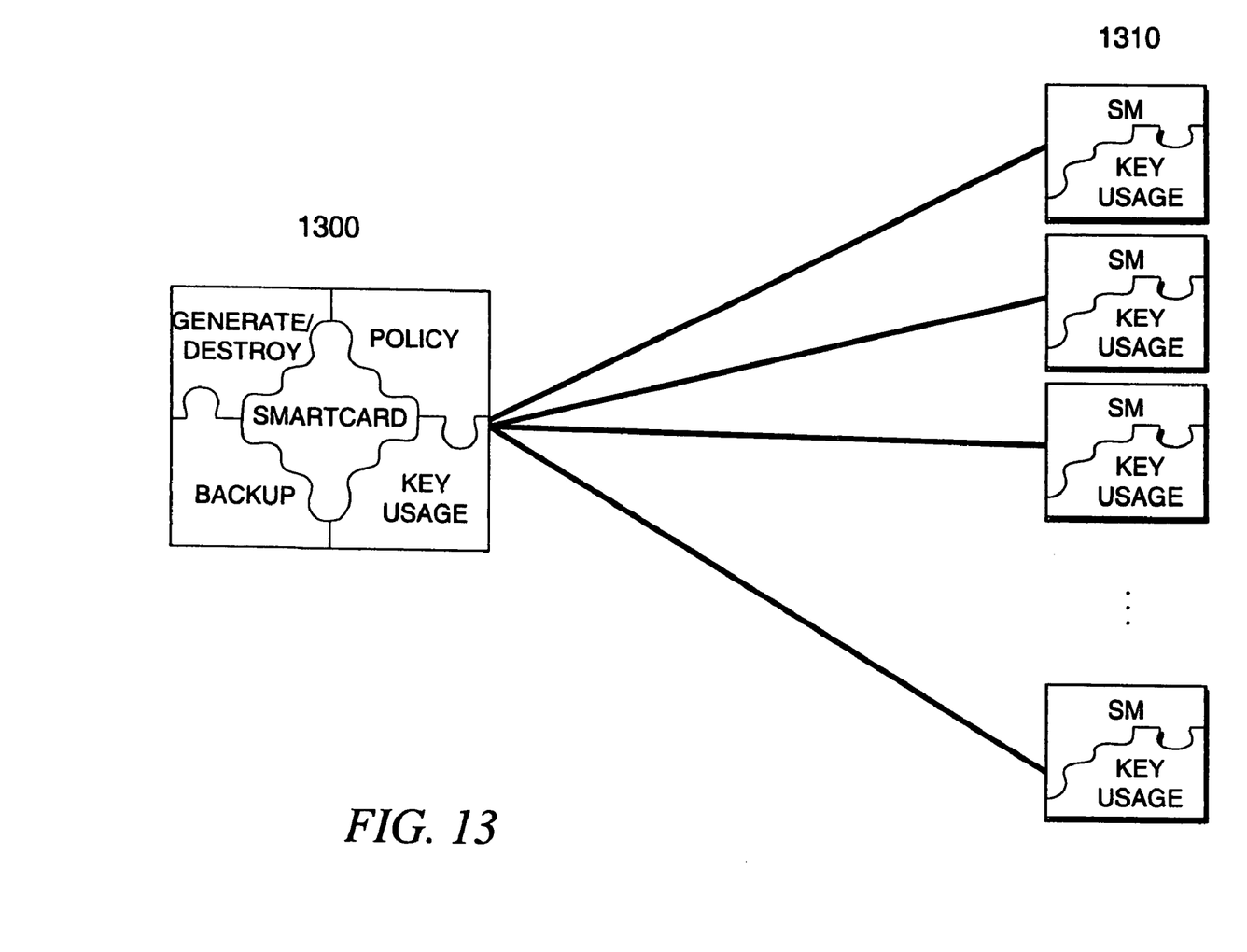
FIG. 13 is a schematic diagram of an embodiment of a key management system that incorporates stateless key management modules (or stateless modules) pursuant to aspects of the invention.

Referring now to FIG. 13, an embodiment of a key management system that incorporates stateless key management modules (hereafter referred to as stateless modules or SMs for convenience) is illustrated. In FIG. 13, smartcard 1300 (e.g., a hardware security module or a SIM) is configured to manage multiple remote stateless modules (or SMs) 1310.

Stateless modules may provide key enforcement and/or usage functions that are, in effect, separated out from the main key management functions provided by a smartcard. For example, a smartcard may provide all of the services for secure key management such as generating and destroying keys, establishing and enforcing key policy, using keys, providing key backup and secure key storage and communicating with peers. Inherently, these operations require that the smartcard keep track of its current state. For example, the smartcard must keep track of all keys it generated and it must maintain state information associated with each of these keys. This information may be used, for example, to determine the entity to which each key was issued and when to destroy or revoke keys. In contrast, the stateless modules provide a mechanism for securely receiving keys and using keys. The stateless modules do not generate keys or conduct peer-to-peer communication. Consequently, they typically must communicate with a key manager to obtain the keys needed by a mobile client (e.g., a mobile phone device, a PDA, etc.).

A stateless module does not need to maintain state information to receive keys and use keys. When a stateless module boots up, the only key information it has is an identity key that was stored in nonvolatile memory. However, this information is stateless because it never changes. To perform its tasks, the stateless module may be configured to establish a secure connection with a smartcard using its identity key. This secure connection enables the stateless module to perform the basic operations of receiving and using keys and/or data. These operations do not, however, require that the stateless module maintain the state of these keys. Rather, the stateless module merely needs to use the keys within a secure boundary and enforce any policy received with the key. As an example, after the smartcard securely sends keys to the stateless module these keys may be used to decrypt data and/or keys for a mobile client (e.g., a mobile phone device, a PDA, etc.). In addition, the stateless module may send secured (e.g., encrypted and/or authenticated) data to a designated device via a secure connection.

The stateless module provides a secure usage environment that may be remotely separated from, yet cryptographically secured to (e.g., using operations that may include encryption, decryption, authentication, etc.), the smartcard. In particular, keys and data within the stateless module are protected by hardware (e.g., the physical constraints provided by the integrated circuit, aka chip). In addition, the stateless module may be configured to prevent the keys and data from being exported from the chip without encryption (or in the clear). Moreover, as illustrated in FIG. 14, a key transfer protocol may be established between stateless module 1410 and smartcard 1400 to allow keys generated in smartcard 1400 to be securely transferred to stateless module 1410.

Figure 14:
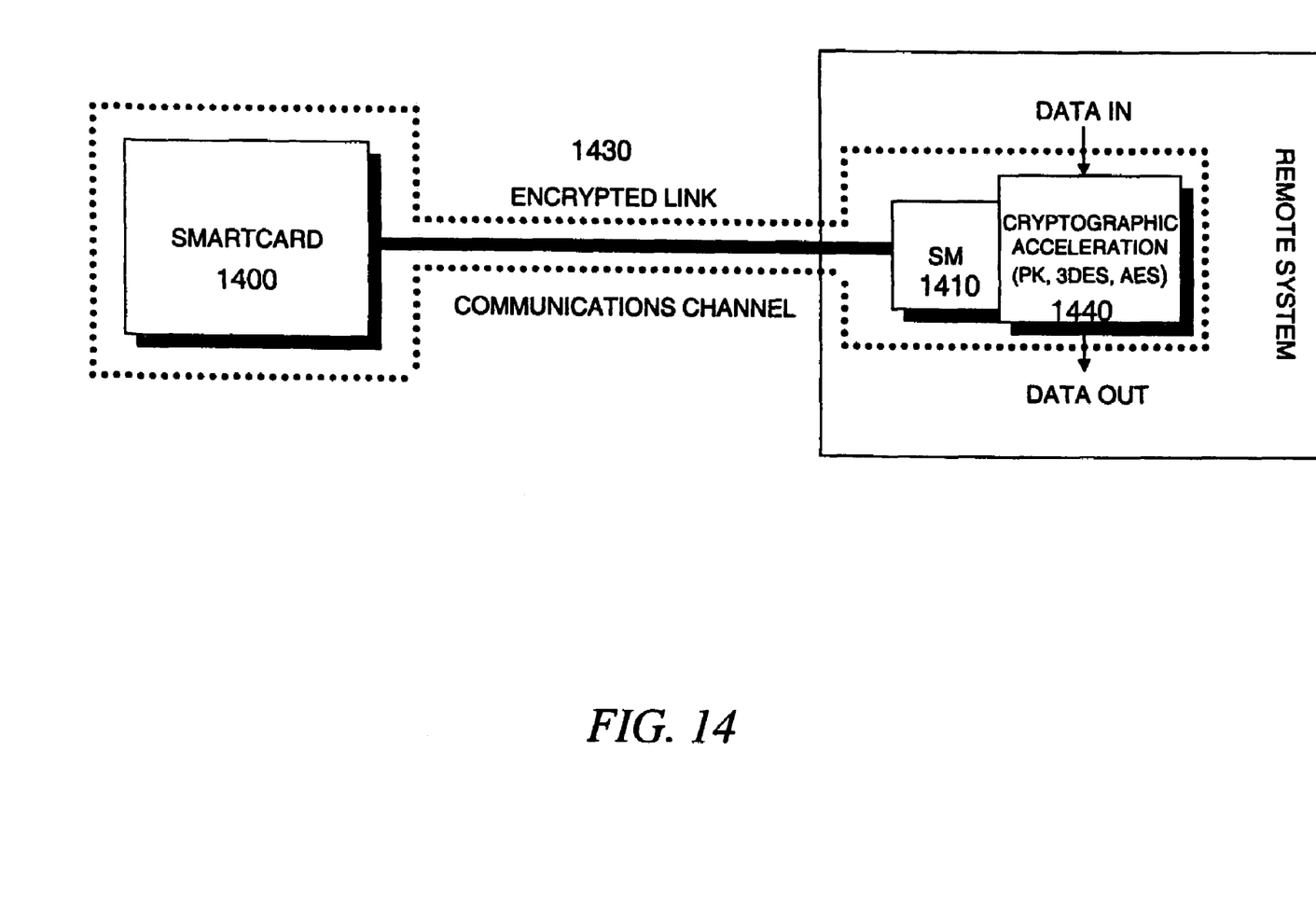
FIG. 14 is a schematic diagram of a key transfer embodiment between a stateless module and a smartcard pursuant to aspects of the invention.

As is shown in FIG. 14 (and discussed above), encrypted link (communication channel) 1430 may be used to effectively extend the security boundary of smartcard 1400 to include the stateless module 1410. Encrypted link 1430 allows for key material to be transferred over an insecure communication medium (i.e. network and/or Internet) between smartcard 1400 and stateless module 1410.

FIG. 14 also illustrates that stateless module 1410 may receive encrypted key material from smartcard 1400 for use with local cryptographic accelerator 1440. Cryptographic accelerator 1440 also may be implemented within the effective security boundary. For example, cryptographic accelerator 1440 and stateless module 1410 may be implemented on the same integrated circuit. Alternatively, keys and data transferred between these components may be encrypted.

Thus, cleartext and ciphertext may be sent to cryptographic accelerator 1440 without exposing the key material outside of the security boundary. As a result, any key material that is decrypted locally by stateless module 1410 may never be exposed outside the security boundary.

Typically, a stateless module is embedded inside a mobile client that uses cryptographic services. For example, the stateless module may be implemented in mobile clients or end-user devices, such as cell phones, laptops, etc., that need some form of data security. The stateless module should be integrated into other chips (e.g., a main processor) within these devices. In this way, the stateless module may provide cost effective remote key management for a mobile client (e.g., a mobile phone device, a PDA, etc.). The security boundary to this mobile client is contained and managed through the stateless module by the smartcard key management system with minimal impact on the rest of the mobile client.

To support the above described key management scheme (i.e., to provide a high level of security at a relatively low cost, while consuming a relatively small amount of space on a mobile client), a stateless module provides mechanisms for securely loading one or more keys into the stateless module, securely storing the keys and securely using the keys. Embodiments of exemplary stateless modules that provide such mechanisms are provided in copending patent application Ser. No. 60/615,290, entitled Stateless Hardware Security Module, filed on Oct. 1, 2004, and assigned to the assignee of the present application, the entire content of which is incorporated herein by reference.

While certain exemplary embodiments have been described in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. For example, a system using SIM cards and GSM mobile network has been illustrated, but it should be apparent that the inventive concepts described above would be equally applicable to systems that use other types of smartcards and/or other types of mobile network. In view of the above it will be understood that the invention is not limited to the particular embodiments or arrangements disclosed, but is rather intended to cover any changes, adaptations or modifications which are within the scope and spirit of the invention as defined by the appended claims and equivalents thereof.

What is claimed is:

1. A communication system for providing secure mobile terminal functions, the system comprising:
   a mobile network;
   a mobile terminal coupled to the mobile network;
   a function capsule including a first function; and
   a smartcard coupled to the mobile terminal, the smartcard having a first key and a second key;
   wherein the first key is used to authenticate an intended user of the mobile terminal to the mobile network and to download the function capsule from the mobile network to the mobile terminal; and
   wherein the second key is used to authenticate the intended user to the function capsule on the mobile terminal.

2. The communication system of claim 1, wherein the mobile network includes a copy of the first key to authenticate the intended user to the mobile network and wherein the function capsule includes a copy of the second key to authenticate the intended user to the function capsule.

3. The communication system of claim 1, wherein the downloaded function capsule from the mobile network is encrypted and wherein the smartcard includes a third key for decrypting the downloaded function capsule.

4. The communication system of claim 1, wherein the first function provides a call waiting service to the mobile terminal.

5. The communication system of claim 1, wherein the first function provides an e-mailing service to the mobile terminal.

6. The communication system of claim 1, wherein the first function provides a financial data service to the mobile terminal.

7. The communication system of claim 1, wherein the smartcard includes a third key and wherein the third key authenticates the intended user to utilize the first function of the function capsule after the second key has authenticated the intended user to the function capsule.

8. The communication system of claim 7, wherein the smartcard includes a fourth key, wherein the function capsule comprises a second function, and wherein the fourth key authenticates the intended user to utilize the second function of the function capsule.

9. The communication system of claim 8, wherein the fourth key authenticates the intended user to utilize the second function of the function capsule after the third key has authenticated the intended user to utilize the first function of the function capsule.

10. The communication system of claim 9, wherein the first function provides an e-mailing service to the mobile terminal and wherein the second function provides a financial data e-mailing service to the mobile terminal.

11. The communication system of claim 8, wherein the third key does not authenticate the intended user to utilize the second function of the function capsule.

12. The communication system of claim 7, wherein the function capsule comprises an authentication module and wherein the authentication module includes a copy of the second key to authenticate the intended user to the function capsule and a copy of the third key to authenticate the intended user to utilize the first function of the function capsule.

13. The communication system of claim 1, further comprising a second network, an authentication server, and a key writing site coupled to the authentication server via the second network, wherein the key writing site is used to write the second key into the smartcard at a time when the intended user desires to utilize the first function of the function capsule and wherein the second key is provided from the authentication server to the key writing site.

14. The communication system of claim 13, wherein the authentication server includes a third key to revoke the second key written into the smartcard of the intended user.

15. The communication system of claim 14, wherein the second key is wirelessly revoked by the authentication server via the mobile network.

16. The communication system of claim 1, further comprising a server coupled to the mobile terminal via the mobile network, wherein the function capsule is downloaded over the mobile network from the server.

17. The communication system of claim 16, wherein the server includes a third key to revoke the second key of the smartcard.

18. The communication system of claim 17, wherein the second key of the smartcard is remotely revoked by the server via the mobile network.

19. The communication system of claim 1, further comprising a key writing site, wherein the key writing site is used to write the second key into the smartcard at a time when the intended user has purchased the first function of the function capsule.

20. The communication system of claim 1, wherein at least one of the first and second keys comprises a private key and a public key and wherein only a copy of the public key is available outside the smartcard to authenticate the intended user.

21. The communication system of claim 1, further comprising a server coupled to the mobile terminal via the mobile network, wherein the function capsule is downloaded over the mobile network from the server and wherein the smartcard includes a third key to authenticate the intended user to access the server.

22. The communication system of claim 21, wherein the server includes a fourth key to revoke one or both of the second and third keys of the smartcard.

23. The communication system of claim 1, wherein the smartcard comprises a subscriber identity module (SIM) card.

24. The communication system of claim 1, further comprising a stateless module coupled to the smartcard and for securely receiving and using keys.

25. The communication system of claim 24, wherein the stateless module provides a secure usage environment for receiving and using keys that is remotely separated from and cryptographically secured to the smartcard.

26. A method for providing secure functions to a mobile client, the method comprising:
transmitting a first random number from within a mobile network to a mobile client;
using a first key in the mobile client to compute a first response based on the transmitted first random number;
transmitting the first response to the mobile network;
using a copy of the first key in the mobile network to calculate a first value based on the first random number;
determining whether the first response agrees with the first value;
terminating access of the mobile client to the mobile network if the first response does not agree with the first value;
downloading a function capsule from the mobile network to the mobile client if the first response agrees with the first value;
providing a second random number from the downloaded function capsule to the mobile client;
using a second key in the mobile client to compute a second response based on the second random number;
using a copy of the second key in the downloaded function capsule to calculate a second value based on the second random number;
determining whether the second response agrees with the second value;
denying access of the mobile client to the downloaded function capsule if the second response does not agree with the second value; and
granting access of the mobile client to the downloaded function capsule if the second response agrees with the second value.

27. The method of claim 26, wherein the mobile client comprises a subscriber identity module (SIM) card and wherein the first and second keys are located within the SIM card.

28. The method of claim 26, wherein the mobile client comprises a smartcard, wherein the first and second keys are stored within the smartcard, and wherein the smartcard is coupled to a stateless module for securely receiving and using keys.

29. The method of claim 28, wherein the stateless module provides a secure usage environment for receiving and using keys that is remotely separated from and cryptographically secured to the smartcard.

* * * * *